United States Patent
Jufuku et al.

(10) Patent No.: US 8,418,788 B2
(45) Date of Patent: Apr. 16, 2013

(54) MOBILE BODY MOUNTED WITH FUEL CELL

(75) Inventors: Yasunobu Jufuku, Mishima (JP); Hiroshi Arisawa, Susono (JP); Junji Nagasawa, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1221 days.

(21) Appl. No.: 12/282,688

(22) PCT Filed: Nov. 8, 2007

(86) PCT No.: PCT/JP2007/072330
§ 371 (c)(1),
(2), (4) Date: Sep. 12, 2008

(87) PCT Pub. No.: WO2008/056832
PCT Pub. Date: May 15, 2008

(65) Prior Publication Data
US 2009/0038867 A1 Feb. 12, 2009

(30) Foreign Application Priority Data
Nov. 10, 2006 (JP) ................. 2006-304996

(51) Int. Cl.
*B60L 3/00* (2006.01)
(52) U.S. Cl.
USPC ............ 180/65.31; 180/65.1; 180/65.8
(58) Field of Classification Search ........... 180/65.1, 180/65.8, 65.31
See application file for complete search history.

(56) References Cited

U.S. PATENT DOCUMENTS

| | | | | |
|---|---|---|---|---|
| 6,764,782 | B2* | 7/2004 | Raiser et al. | 429/430 |
| 7,213,664 | B2* | 5/2007 | Nomura et al. | 180/65.1 |
| 7,600,595 | B2* | 10/2009 | Harris | 180/65.31 |
| 7,975,788 | B2* | 7/2011 | Yoshida et al. | 180/65.31 |
| 8,080,342 | B2* | 12/2011 | Tabuchi | 429/413 |
| 2004/0247962 | A1* | 12/2004 | Toukura | 429/22 |
| 2006/0068240 | A1* | 3/2006 | Matoba | 429/12 |
| 2007/0007194 | A1* | 1/2007 | Yoshida et al. | 210/359 |
| 2010/0176220 | A1* | 7/2010 | Yoshida et al. | 239/418 |

FOREIGN PATENT DOCUMENTS

| | | |
|---|---|---|
| JP | 9 156382 | 6/1997 |
| JP | 2001 71753 | 3/2001 |
| JP | 2002 289237 | 10/2002 |
| JP | 2004 22463 | 1/2004 |
| JP | 2005 306230 | 11/2005 |
| JP | 2005 317276 | 11/2005 |
| JP | 2005 317387 | 11/2005 |
| JP | 2005 332674 | 12/2005 |
| JP | 2005 348483 | 12/2005 |
| JP | 2006 141154 | 6/2006 |
| JP | 2006 180631 | 7/2006 |
| JP | 2006 196388 | 7/2006 |
| WO | WO 02/27848 A2 | 4/2002 |
| WO | WO 04/000601 A | 12/2003 |
| WO | WO 2005/091397 A2 | 9/2005 |
| WO | WO 2005/091397 A3 | 9/2005 |

\* cited by examiner

*Primary Examiner* — J. Allen Shriver, II
*Assistant Examiner* — Travis Coolman
(74) *Attorney, Agent, or Firm* — Oblon, Spivak, McClelland, Maier & Neustadt, L.L.P.

(57) ABSTRACT

A vehicle 1000 is equipped with a fuel cell system 100 and a secondary battery as power sources. A water level of water present on a water-covered road surface is measured by a water level sensor 72. When the measured water level reaches or exceeds a preset threshold value, drive control of the vehicle 1000 stops power generation by a fuel cell stack 10, closes a discharge valve 62, and enables the vehicle 1000 to be driven with output power of a motor that is actuated with electric power from the secondary battery. This arrangement effectively prevents a damage or failure of the fuel cells mounted on the vehicle moving on the water-covered road.

12 Claims, 9 Drawing Sheets

MOBILE BODY MOUNTED WITH FUEL CELL

TECHNICAL FIELD

The present invention relates to a moving body equipped with fuel cells and more specifically to a technique applied to a moving body that is equipped with fuel cells and is driven on water-covered road or its equivalency.

BACKGROUND ART

Diverse vehicles equipped with fuel cells have been proposed. In any of these vehicles, electric power generated by the fuel cells is used to drive a motor. The driven motor outputs power to rotate an axle and wheels of the vehicle and accordingly move the vehicle. The vehicle has an exhaust pipe and an outlet arranged to discharge the exhaust gas from the fuel cells to the outside of the vehicle. Like conventional vehicles driven with power of an internal combustion engine, the outlet is typically located below the floor at a rear end of the vehicle body (see, for example, Japanese Patent Laid-Open No. 2002-289237). This arrangement of the outlet enables the exhaust gas discharged from the fuel cells and water produced in the course of power generation or by electrochemical reaction of hydrogen with oxygen (hereafter the exhaust gas and the produced water may collectively be referred to as 'exhaust fluid') to be directly emitted onto the road surface.

During a motion of the conventional vehicle equipped with the fuel cells according to the structure disclosed in Japanese Patent Laid-Open No. 2002-289237 on the water-covered road, however, the outlet may be blocked with water or sediment that is present on the road surface, so as to interfere with the smooth emission of the exhaust gas. This may stop power generation by the fuel cells and interfere with a further motion of the vehicle. The water or sediment flowed into the outlet may reach the inside of the fuel cells via piping and cause a damage or failure of the fuel cells. Namely the prior art techniques have no special consideration for potential troubles due to blockage of the outlet by an obstructing object, such as water or sediment, during a motion of the vehicle equipped with the fuel cells on the water-covered road.

This problem is not specifically found in the vehicles equipped with fuel cells but commonly arises in any of various moving bodies that are moved with electric power generated by fuel cells as a power source. Typical examples of such moving bodies include aircraft and boats and ships, as well as the vehicles.

DISCLOSURE OF THE INVENTION

There would thus be a demand for providing a technique applied to a moving body that is equipped with fuel cells and is driven on water-covered road or its equivalency.

The present invention accomplishes at least part of the demands mentioned above and the other relevant demands by the following configuration. According to one aspect, the invention pertains to a first moving body equipped with fuel cells. The first moving body has: a motor configured to be driven with electric power output from the fuel cells; an exhaust pipe arranged to discharge an exhaust fluid from the fuel cells to outside of the moving body via an outlet; a detector configured to detect an environment surrounding the moving body; a decision module configured to identify a potential or no potential for any obstructing object to block the outlet or to be flowed into the exhaust pipe through the outlet, based on a result of detection by the detector; and a controller configured to, upon identification of the potential for any obstructing object to block the outlet or to be flowed into the exhaust pipe through the outlet by the decision module, stop power generation by the fuel cells. The obstructing object is, for example, water present on water-covered road, sediment, a dropping object from the air, a falling object, or a floating object.

In this aspect of the invention, during a motion of the moving body on, for example, water-covered road, the moving body detects the surrounding environment and, upon identification of the potential for any obstructing object to block the outlet or to be flowed into the exhaust pipe through the outlet based on a result of the detection, stops power generation by the fuel cells. This arrangement effectively prevents a damage or failure of the fuel cells mounted on the moving body that moves on, for example, the water-covered road.

A typical example of the moving body is a vehicle. In this case, the detector may be, for example, a water level sensor designed to observe a water level of water as the obstructing object that is present in the environment surrounding the vehicle, that is, on the road surface where the vehicle is driven. Another example of the detector may identify the presence of any obstructing object on the road surface, for example, based on water coverage information collected from an information center by communication. Still another example of the detector may take an image of the road surface condition with a camera mounted on the driving vehicle and analyzes the taken image by image processing to identify the presence of any obstructing object on the road surface.

The position of the outlet is naturally known in the moving body. For example, the decision module may identify a potential or no potential for water present on the road surface to be flowed into the exhaust pipe through the outlet, based on the water level observed by the water level sensor.

In one preferable embodiment of the above aspect of the invention, the moving body further has: a second battery other than the fuel cells; and a changeover switch designed to change over a driving source of the motor between the electric power output from the fuel cells and electric power output from the second battery. Upon identification of the potential for any obstructing object to block the outlet or to be flowed into the exhaust pipe through the outlet by the decision module, the controller controls an operation of the changeover switch to change over the driving source of the motor to the electric power output from the second battery. Even in the event of stopping power generation by the fuel cells during a motion of the moving body on, for example, the water-covered road in response to identification of the potential for any obstructing object to block the outlet or to be flowed into the exhaust pipe through the outlet, this arrangement enables the moving body to be continuously moved with output power of the motor, which is actuated with the electric power output from the second battery.

According to one preferable application of the invention, a discharge valve is provided either at the outlet or in the exhaust pipe in the moving body. Upon identification of the potential for any obstructing object to block the outlet or to be flowed into the exhaust pipe through the outlet by the decision module, the controller closes the discharge valve.

In the state of stopping power generation by the fuel cells during a motion of the moving body on, for example, the water-covered road, the exhaust fluid from the fuel cells is not discharged out from the exhaust pipe. This increases the potential for the obstructing object to be flowed into the exhaust pipe through the outlet. The moving body of this application closes the discharge valve in this case and thereby effectively prevents the inflow of the obstructing object into the exhaust pipe through the outlet.

According to another preferable application of the invention, the moving body further has an air supplier configured to supply the air, which has a higher pressure than a back pressure of the exhaust fluid in the exhaust pipe, to the exhaust pipe. Upon identification of the potential for any obstructing object to block the outlet or to be flowed into the exhaust pipe through the outlet by the decision module, the controller controls an operation of the air supplier to supply the air to the exhaust pipe. In the event of stopping power generation by the fuel cells in response to identification of the potential for any obstructing object to block the outlet or to be flowed into the exhaust pipe through the outlet, this arrangement increases the back pressure in the exhaust pipe and thus effectively prevents the obstructing object from blocking the outlet or from being flowed into the exhaust pipe through the outlet.

In one preferable structure of the moving body of the above application, the fuel cells are equipped with an oxidizing gas supplier to supply an oxidizing gas. The oxidizing gas supplier includes an air compressor designed to compress the air as the oxidizing gas. The air compressor is also used as the air supplier. This structure does not require a separate air compressor used in the air supplier from the air compressor used in the oxidizing gas supplier and thus desirably enables size reduction of the moving body.

In one preferable example of the invention, the moving body of the above structure further has: a bypass conduit arranged to supply the compressed air compressed by the air compressor to the exhaust pipe with bypassing the fuel cells; and a changeover valve designed to change over a supply destination of the compressed air between the fuel cells and the exhaust pipe via the bypass conduit. Upon identification of the potential for any obstructing object to block the outlet or to be flowed into the exhaust pipe through the outlet by the decision module, the controller controls an operation of the changeover valve to supply the compressed air to the exhaust pipe via the bypass conduit. In the moving body of this example, the compressed air compressed by the air compressor is flowed through the bypass conduit to be introduced into the exhaust pipe with bypassing the fuel cells. Compared with the introduction of the compressed air compressed by the air compressor into the exhaust pipe via the fuel cells, this arrangement increases the back pressure in the exhaust pipe and thus enhances the effect of preventing the inflow of the obstructing object into the exhaust pipe through the outlet.

In one preferable example of the moving body equipped with the air supplier, the exhaust pipe includes: an anode off gas discharge conduit arranged to flow an anode off gas discharged from anodes of the fuel cells; and a cathode off gas discharge conduit arranged to flow a cathode off gas discharged from cathodes of the fuel cells. The anode off gas discharge conduit joins with the cathode off gas discharge conduit. The anode off gas discharge conduit is equipped with a passage switchover valve arranged to switch over between passage and blockage of the anode off gas discharge conduit. Upon identification of the potential for any obstructing object to block the outlet or to be flowed into the exhaust pipe through the outlet by the decision module, the controller controls an operation of the passage switchover valve to switch over to the blockage of the anode off gas discharge conduit. In the event of stopping power generation by the fuel cells in response to identification of the potential for any obstructing object to block the outlet or to be flowed into the exhaust pipe through the outlet, the moving body of this example blocks the anode off gas discharge conduit. This arrangement effectively prevents the inflow of the air as the oxidizing gas through the anode off gas discharge conduit into the anodes of the fuel cells.

According to another aspect, the present invention is directed to a second moving body equipped with fuel cells. The second moving body has: a motor configured to be driven with electric power output from the fuel cells; a fuel gas supplier arranged to supply a fuel gas to the fuel cells; an oxidizing gas supplier arranged to supply an oxidizing gas to the fuel cells; an exhaust pipe arranged to discharge an exhaust gas from the fuel cells to outside of the moving body via an outlet; a detector configured to detect an environment surrounding the moving body; a decision module configured to identify a potential or no potential for any obstructing object to block the outlet or to be flowed into the exhaust pipe through the outlet, based on a result of detection by the detector; and a controller configured to, upon identification of the potential for any obstructing object to block the outlet or to be flowed into the exhaust pipe through the outlet by the decision module, increase at least one of a flow rate of the fuel gas to the fuel cells by the fuel gas supplier and a flow rate of the oxidizing gas to the fuel cells by the oxidizing gas supplier, regardless of a flow rate of the fuel gas or the oxidizing gas corresponding to a power demand for the fuel cells.

In this aspect of the invention, during a motion of the moving body on, for example, the water-covered road, the moving body detects the surrounding environment and, upon identification of the potential for any obstructing object to block the outlet or to be flowed into the exhaust pipe through the outlet based on a result of the detection, increases at least one of the flow rate of the fuel gas to the fuel cells by the fuel gas supplier and the flow rate of the oxidizing gas to the fuel cells by the oxidizing gas supplier, regardless of the flow rate of the fuel gas or the oxidizing gas corresponding to the power demand for the fuel cells. During a motion of the moving body equipped with the fuel cells on, for example, the water-covered road, in response to identification of the potential for any obstructing object to block the outlet or to be flowed into the exhaust pipe through the outlet, the emission of the exhaust fluid is increased regardless of the flow rate of the fuel gas or the oxidizing gas corresponding to the power demand for the fuel cells, so as to increase the back pressure in the exhaust pipe. This arrangement enables the moving body to be continuously moved on the water-covered road while preventing the obstructing object from blocking the outlet or from being flowed into the exhaust pipe through the outlet.

In one preferable embodiment of the moving body according to the above aspect of the invention, the exhaust pipe includes: an anode off gas discharge conduit arranged to flow an anode off gas discharged from anodes of the fuel cells; and a cathode off gas discharge conduit arranged to flow a cathode off gas discharged from cathodes of the fuel cells. The anode off gas discharge conduit joins with the cathode off gas discharge conduit. The anode off gas discharge conduit is equipped with a passage switchover valve arranged to switch over between passage and blockage of the anode off gas discharge conduit. Upon identification of the potential for any obstructing object to block the outlet or to be flowed into the exhaust pipe through the outlet by the decision module, the controller controls an operation of the passage switchover valve to switch over to the blockage of the anode off gas discharge conduit, while increasing the flow rate of the oxidizing gas to the fuel cells by the oxidizing gas supplier, irrespective of the power demand for the fuel cells. In response to identification of the potential for any obstructing object to block the outlet or to be flowed into the exhaust pipe through the outlet, the flow rate of the oxidizing gas to the fuel cells is increased, so as to increase the back pressure in the exhaust pipe. This arrangement effectively prevents the inflow of the obstructing object into the exhaust pipe through the outlet. The blockage of the anode off gas discharge conduit desirably prevents the inflow of the air as the oxidizing gas through the anode off gas discharge conduit into the anodes of the fuel cells.

In one preferable application of the moving body of the above embodiment, in the event of re-identification of the potential for any obstructing object to block the outlet or to be flowed into the exhaust pipe through the outlet by the decision module after elapse of a preset time period since the controller controlled the operation of the passage switchover valve to switch over to the blockage of the anode off gas discharge conduit and increased the flow rate of the oxidizing gas to the fuel cells by the oxidizing gas supplier irrespective of the power demand for the fuel cells in response to identification of the potential for any obstructing object to block the outlet or to be flowed into the exhaust pipe through the outlet by the decision module, the controller controls the operation of the passage switchover valve to switch over to the passage of the anode off gas discharge conduit, while increasing a back pressure of the anode off gas in the anode off gas discharge conduit to be higher than a back pressure of the cathode off gas in the cathode off gas discharge conduit.

The oxygen-containing air is generally used as the oxidizing gas supplied to the cathodes of the fuel cells. The air includes nitrogen and other impurity gases that are not subjected to power generation by the fuel cells. The impurity gases are transmitted through electrolyte membranes to move from the cathodes to the anodes in the fuel cells. In the case of power generation by the fuel cells in the blockage state of the anode off gas discharge conduit, the impurity gases are not discharged outside but are accumulated in the fuel cells and in the anode off gas discharge conduit to lower the power generation performance. The similar problem arises in supply of a hydrogen-containing fuel gas including impurity gases, which are not subjected to power generation by the fuel cells, to the anodes of the fuel cells.

In the moving body of the above application, power generation by the fuel cells is performed in the blockage state of the anode off gas discharge conduit. In response to re-identification of the potential for any obstructing object to block the outlet or to be flowed into the exhaust pipe through the outlet even after elapse of the preset time period, the moving body of this application controls the operation of the passage switchover valve to switch over to the passage of the anode off gas discharge conduit, while increasing the back pressure of the anode off gas in the anode off gas discharge conduit to be higher than the back pressure of the cathode off gas in the cathode off gas discharge conduit. This arrangement desirably purges out and discharges out the impurity gases accumulated in the fuel cells and in the anode off gas discharge conduit, while effectively preventing the inflow of the air as the oxidizing gas through the anode off gas discharge conduit into the anodes of the fuel cells.

According to still another aspect, the present invention is directed to a third moving body equipped with fuel cells. The third moving body has: an insulation resistance tester designed to measure an insulation resistance between the fuel cells and a conductive member to be insulated from the fuel cells; and a startup controller configured to prohibit a startup of the fuel cells when the insulation resistance measured by the insulation resistance tester is less than a preset level.

The fuel cells are typically kept in a metal (conductive) casing and are then mounted on the moving body. The metal casing is to be insulated from the fuel cells, in order to prevent a damage or failure of the fuel cells due to a short circuit between the fuel cells and the casing.

During the motion of the moving body equipped with the fuel cells on the water-covered road, water may be invaded into the metal casing. Even after drainage of water from the casing, there by a short circuit between the fuel cells and the casing by means of water until the inside of the casing is sufficiently dried out. A startup of the fuel cells in this short circuit state may lead to a damage or failure of the fuel cells.

The moving body according to this aspect of the invention measures the insulation resistance between the fuel cells and the conductive member (for example, the casing) to be insulated from the fuel cells at the time of a startup of the fuel cells. When the measured insulation resistance is less than the preset level, the startup of the fuel cells is prohibited. This arrangement effectively prevents a potential damage or failure of the fuel cells due to a short circuit between the fuel cells and the conductive member, thus ensuring a safe startup of the fuel cells.

The present invention is not restricted to the moving body described above, but may be actualized by diversity of other applications, for example, a control method of fuel cells mounted on any of such moving bodies, as well as a computer program for actualizing the control method of the fuel cells, a recording medium in which such a computer program is recorded, and a data signal that includes such a computer program and is embodied in a carrier wave. Any of the various additional arrangements explained above may be adopted for any of these applications.

In the applications of the invention as the computer program and the recording medium in which the computer program is recorded, the invention may be given as a whole program to control the operations of the fuel cells mounted on the moving body or as a partial program to exert only the characteristic functions of the invention. Available examples of the recording medium include flexible disks, CD-ROMs, DVD-ROMs, magneto-optical disks, IC cards, ROM cartridges, punched cards, prints with barcodes or other codes printed thereon, internal storage devices (memories like RAMs and ROMs) and external storage devices of the computer, and diversity of other computer readable media.

BEST MODE FOR CARRYING OUT THE INVENTION

Some modes of carrying out the invention are described below as preferred embodiments with reference to the accompanied drawings.

A. First Embodiment

A1. Configuration of Vehicle

Figure 1:
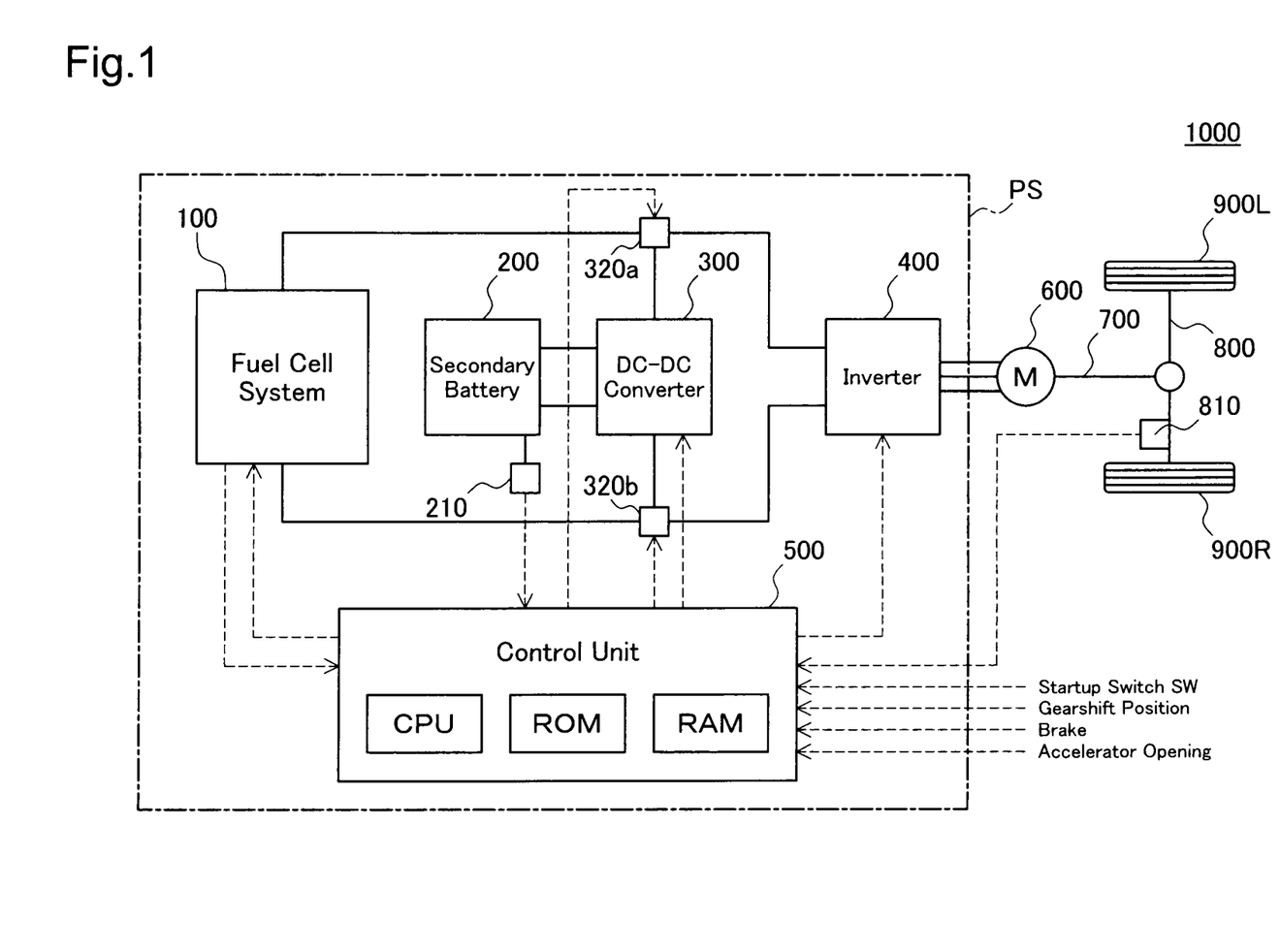
FIG. 1 schematically illustrates the configuration of a vehicle 1000 according to one embodiment of the invention.

FIG. 1 schematically illustrates the configuration of a vehicle 1000 in one embodiment of the invention. As illustrated, the vehicle 1000 is an electric vehicle and includes a power system PS and a motor 600.

The motor 600 is driven with a supply of electric power from the power system PS and accordingly generates and outputs driving power. The output power of the motor 600 is transmitted through an output shaft 700 and a driveshaft 800 to wheels 900L and 900R. A vehicle speed sensor 810 is attached to the driveshaft 800. The motor 600 may be any of various types of motors but is a three-shape synchronous motor in this embodiment. The vehicle 1000 is equivalent to the moving body of the invention.

A2. Structure of Power System

The power system PS has a fuel cell system 100 including a fuel cell stack, a secondary battery 200, a DC-DC converter 300, an inverter 400, and a control unit 500. The secondary battery 200 is equivalent to the second battery of the invention. The details of the fuel cell system 100 will be described later.

As illustrated, the secondary battery 200 is connected in parallel with the fuel cell stack included in the fuel cell system 100 via the DC-DC converter 300. The secondary battery 200 may be any of various storage batteries, for example, a lead acid battery, a nickel-cadmium battery, a nickel-metal hydride battery, or a lithium rechargeable battery. Changeover switches 320a and 320b are provided in the middle of the parallel connection of the secondary battery 200 with the fuel cell stack. At a start of the fuel cell system 100, the changeover switches 320a and 320b are operated to supply electric power from the secondary battery 200 and activate the respective constituents of the fuel cell system 100. In the event of an insufficiency of electric power supply from the fuel cell system 100, the changeover switches 320a and 320b are operated to supply electric power from the secondary battery 200 and compensate for the insufficiency. The secondary battery 200 is connected to a state-of-charge sensor 210 to measure the remaining charge or the state of charge of the secondary battery 200. The secondary battery 200 is appropriately charged with electric power from the fuel cell stack included in the fuel cell system 100 or with electric power generated by regenerative braking, based on the measurement of its state of charge.

The DC-DC converter 300 regulates an output voltage supplied from the fuel cell stack included in the fuel cell system 100 or from the secondary battery 200. The inverter 400 converts electric power supplied from the fuel cell stack or the secondary battery 200 into three-phase alternating current and supplies the three-phase alternating current to the motor 600.

The control unit 500 is constructed as a microcomputer including a CPU, a ROM, a RAM, and a timer. The control unit 500 receives various input signals and performs diversity of control operations, for example, a series of drive control as described later, in response to the input signals according to programs stored in the ROM. The input signals include those representing the operating conditions of the vehicle 1000 and those representing the operating conditions of the power system PS. The former input signals include, for example, a vehicle speed from the vehicle speed sensor 810, an on-off signal of a startup switch of the motor 600, a gearshift position, an on-off signal of a foot brake, and an accelerator opening. The latter input signals include, for example, state of charge of the secondary battery 200 from the state-of-charge sensor 210, temperatures and pressures of the respective constituents in the fuel cell system 100, and outputs of a water level sensor and an insulation resistance tester. Output signals from the control unit 500 include, for example, control signals for controlling the operations of the respective constituents in the fuel cell system 100, the DC-DC converter 300, and the inverter 400. The control unit 500 corresponds to the decision module, the controller, and the startup controller of the invention.

A3. Structure of Fuel Cell System

Figure 2:
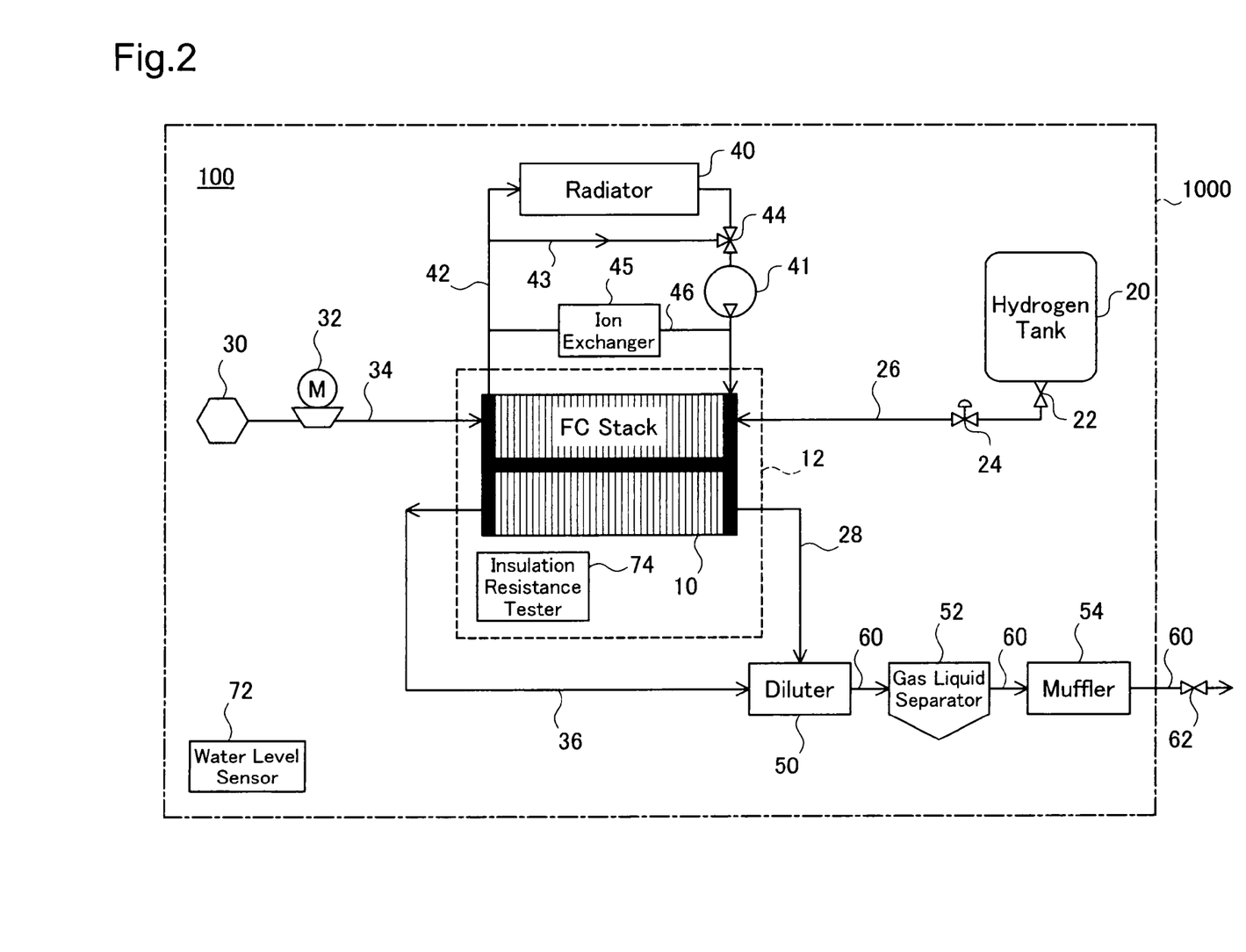
FIG. 2 schematically illustrates the structure of a fuel cell system 100 mounted on the vehicle 1000 in a first embodiment.

FIG. 2 schematically illustrates the structure of the fuel cell system 100 mounted on the vehicle 1000. In response to the driver's operation of an accelerator (not shown) provided in the vehicle 1000, the fuel cell system 100 starts power generation corresponding to an operation amount of the accelerator measured by an accelerator opening sensor (not shown).

A fuel cell (FC) stack 10 in the fuel cell system 100 is a laminate of multiple fuel cells constructed to generate electric power through electrochemical reaction of hydrogen with oxygen. Each fuel cell has a hydrogen electrode (anode) and an oxygen electrode (cathode) arranged across a proton-conductive electrolyte membrane, although the structure is not specifically illustrated. The fuel cells used in this embodiment are polymer electrolyte fuel cells having solid polymer membranes made of, for example, Nafion (registered trademark) for the electrolyte membrane, although the fuel cell stack 10 may consist of any of various other types of fuel cells.

In the structure of the embodiment, the fuel cell stack 10 is held in a metal stack casing 12 as illustrated. An insulation resistance tester 74 used to measure the insulation resistance between the fuel cell stack 10 and the stack casing 12 is also provided in the stack casing 12. The insulation resistance tester 74 is used in a series of startup control as described later.

The vehicle 1000 of this embodiment also has a water level sensor 72 used to observe the level of water present on the road surface. The water level sensor 72 may be a contact type of being in contact with water to observe the water level, such as a flow switch or a capacitance sensor, or a non-contact type of not being in contact with water to observe the distance from the water surface, such as an ultrasonic sensor. The water level sensor 72 is used in a series of drive control by taking into account the motion of the vehicle on the water-covered road as described later. The water level sensor 72 is equivalent to the detector of the invention.

A supply of hydrogen is fed as a fuel gas from a hydrogen tank 20, which is designed to store high-pressure hydrogen, via piping 26 to the anodes of the fuel cell stack 10. The hydrogen tank 20 may be replaced with a hydrogen generator of producing hydrogen through a reforming reaction from a starting material, such as an alcohol, a hydrocarbon, or an aldehyde.

The high-pressure hydrogen stored in the hydrogen tank 20 is subjected to regulation of the pressure and the flow rate by means of a shut valve 22 and a regulator 24 located at an outlet of the hydrogen tank 20 and is introduced into the anodes of the fuel cell stack 10. The hydrogen tank 20 and its relevant components correspond to the fuel gas supplier of the invention. An exhaust gas from the anodes (hereafter referred to as anode off gas) is flowed into piping 28. The piping 28 is equivalent to the anode off gas discharge conduit of the invention. The anode off gas contains remaining hydrogen unconsumed by power generation of the fuel cell stack 10.

The compressed air is supplied as an oxygen-containing oxidizing gas to the cathodes of the fuel cell stack 10. The air is taken in by an air cleaner 30, is compressed by an air compressor 32, and is flowed through piping 34 to be introduced into the cathodes of the fuel cell stack 10. A humidifier may be provided on the piping 34 to moist the air supplied to the fuel cell stack 10. The air compressor 32 and its relevant components correspond to the oxidizing gas supplier of the invention. An exhaust gas from the cathodes (hereafter referred to as cathode off gas) is flowed into piping 36. The piping 36 is equivalent to the cathode off gas discharge conduit of the invention. The cathode off gas contains water produced by the electrochemical reaction of hydrogen with oxygen.

The anode off gas flowed into the piping 28 and the cathode off gas flowed into the piping 36 are introduced into a diluter 50. The diluter 50 mixes the introduced anode off gas with the introduced cathode off gas to lower the concentration of hydrogen contained in the anode off gas.

An exhaust gas discharged from the diluter 50 is introduced into a gas liquid separator 52 via piping 60. The gas liquid separator 52 separates and removes water included in the exhaust gas discharged from the diluter 50 (mainly the produced water contained in the cathode off gas). After the separation and removal of water by the gas liquid separator 52, the exhaust gas flows through a muffler 54 and is emitted from an outlet at one end of the piping 60 to the outside of the vehicle 1000. The water separated by the gas liquid separator 52 flows through a drain (not shown) provided in the gas liquid separator 52 and is discharged outside. The piping 60 is equivalent to the exhaust pipe of the invention. The outlet is located below the floor at a rear end of the vehicle 1000 (not shown).

The fuel cell stack 10 produces heat through the electrochemical reaction, so that cooling water is flowed into the fuel cell stack 10 for cooling down the fuel cell stack 10. The cooling water is flowed through cooling water piping 42 by means of a circulation pump 41, is cooled down by a radiator 40, and is flowed into the fuel cell stack 10. The cooling water piping 42 is connected with bypass piping 43 to circulate the flow of cooling water with bypassing the radiator 40. A three-way valve 44 is provided at one connection of the piping 42 with the bypass piping 43. A switchover of the three-way valve 44 enables the flow of cooling water to bypass the radiator 40 and to be circulated through the piping 42 and the bypass piping 43. An ion exchanger 45 is also connected to the piping 42 via piping 46. The ion exchanger 45 removes various ions from the cooling water, which may cause a drop of insulation resistance in the fuel cell stack 10.

The stack casing 12 with the fuel cell stack 10 held therein is located below the floor of the vehicle 1000, although this layout is not specifically illustrated. The diluter 50, the gas liquid separator 52, the muffler 54, and the piping 60 for interconnecting these elements are also located below the floor of the vehicle 1000. The hydrogen tank 20 is placed below a rear seat of the vehicle 1000. This arrangement allows the effective use of the space below the floor of the vehicle 1000. The arrangement of the fuel cell stack 10 and its relevant components below the floor of the vehicle 1000 desirably lowers the center of gravity of the vehicle 1000 and enhances the driving stability of the vehicle 1000.

The radiator 40, the circulation pump 41, the ion exchanger 45, the secondary battery 200, the DC-DC converter 300, the inverter 400, the control unit 500, and the motor 600 are located in a front space of the vehicle 1000. Compared with the arrangement of locating the fuel cell stack 10 and its relevant components in the neighborhood of the radiator 40, this arrangement of the embodiment leaves a wide vacant space surrounding the radiator 40. This effectively increases the heat dissipation rate of the radiator 40 and thereby enhances the air-cooling efficiency of the cooling water.

A4. Drive Control

The vehicle 1000 of the embodiment has two different types of drive modes, an FC drive mode and an EV drive mode. In the FC drive mode, the vehicle 1000 is driven with the output power of the motor 600, which is actuated with the electric power generated by the fuel cell stack 10. In the EV drive mode, the vehicle 1000 is driven with the output power of the motor 600, which is actuated with the electric power output from the secondary battery 200. The control unit 500 controls the on-off conditions of the changeover switches 320*a* and 320*b* (see FIG. 1) to switch over the drive mode. For example, the drive control may selectively activate the FC drive mode in response to a relatively high power demand for the power system PS and selectively activate the EC drive mode in response to a relatively low power demand for the power system PS. In this embodiment, in the FC drive mode, the vehicle 1000 may not be driven with only the electric power generated by the fuel cell stack 10 but may be driven with the electric power output from the secondary battery 200 as an auxiliary portion in combination with the electric power generated by the fuel cell stack 10 as a main portion.

As explained previously, the prior art technique has not considered the potential for driving the vehicle equipped with fuel cells on the water-covered road. The vehicle 1000 of the embodiment, on the other hand, enables drive control taking into account the potential for driving on the water-covered road. The following describes a series of drive control taking into account the motion of the vehicle 1000 in the FC drive mode on the water-covered road.

Figure 3:
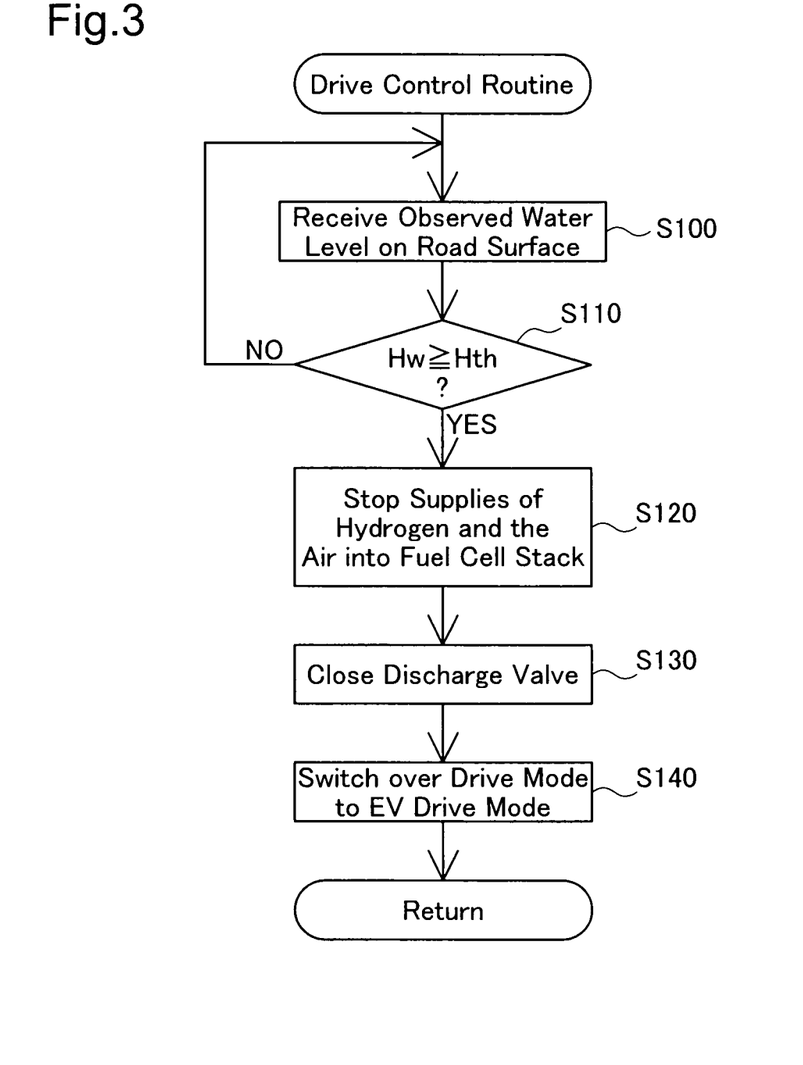
FIG. 3 is a flowchart showing a drive control routine executed in the first embodiment.

FIG. 3 is a flowchart showing a drive control routine executed in the first embodiment. This drive control is performed by the CPU of the control unit 500 during a motion of the vehicle 1000 in the FC drive mode.

The CPU first receives an observed water level Hw representing the level of water present on the road surface from the water level sensor 72 (step S100) and determines whether the observed water level Hw is not lower than a preset threshold value Hth (step S110). The threshold value Hth is set based on the location (height) of the outlet at the end of the piping 60 in the vehicle 1000 and is used as a criterion for identifying the potential for inflow of water and sediment into the piping 60 through the outlet during a motion of the vehicle 1000 on the water-covered road. The same threshold value Hth is used in drive control procedures of second through fourth embodiments described later.

When the water level Hw observed by the water level sensor 72 is not lower than the preset threshold value Hth (step S110: yes), the CPU identifies the potential for the inflow of water and sediment into the piping 60 through the outlet. The CPU accordingly stops the supplies of hydrogen and the air into the fuel cell stack 10 (step S120) to stop power generation of the fuel cell stack 10. The CPU then closes a discharge valve 62 (step S130). Closing the discharge valve 62 effectively prevents the inflow of water and sediment into the piping 60 through the outlet and thereby desirably protects the fuel cell stack 10 from a potential damage or failure.

The CPU subsequently controls the on-off conditions of the changeover switches 320*a* and 320*b* shown in FIG. 1 to switch over the drive mode from the FC drive mode to the EV drive mode (step S140).

When the water level Hw observed by the water level sensor 72 is lower than the preset threshold value Hth (step S110: no), on the other hand, the CPU identifies substantially no potential for the inflow of water and sediment into the piping 60 through the outlet and returns the drive control routine to step S100.

As described above, during a motion of the vehicle 1000 on the water-covered road in the FC drive mode, in response to detection of the level of water present on the road surface that is of or over the preset threshold value Hth, the drive control of the first embodiment immediately stops power generation by the fuel cell stack 10 to protect the fuel cell stack 10 from a potential damage or failure, while enabling the vehicle 1000 to be continuously driven with the switchover of the drive mode to the EV drive mode.

A5. Startup Control

During the motion of the vehicle 1000 on the water-covered road, water may be invaded into the stack casing 12. Even after drainage of water from the stack casing 12, there may be a short circuit between the fuel cell stack 10 and the stack casing 12 by means of water until the inside of the stack casing 12 is sufficiently dried out. Startup of the fuel cell system 100 in this short circuit state may lead to a damage or failure of the fuel cell system 100. The vehicle 1000 of the embodiment thus performs startup control for a restart of the vehicle 1000 after the motion of the vehicle 1000 on the water-covered road as described below.

Figure 4:
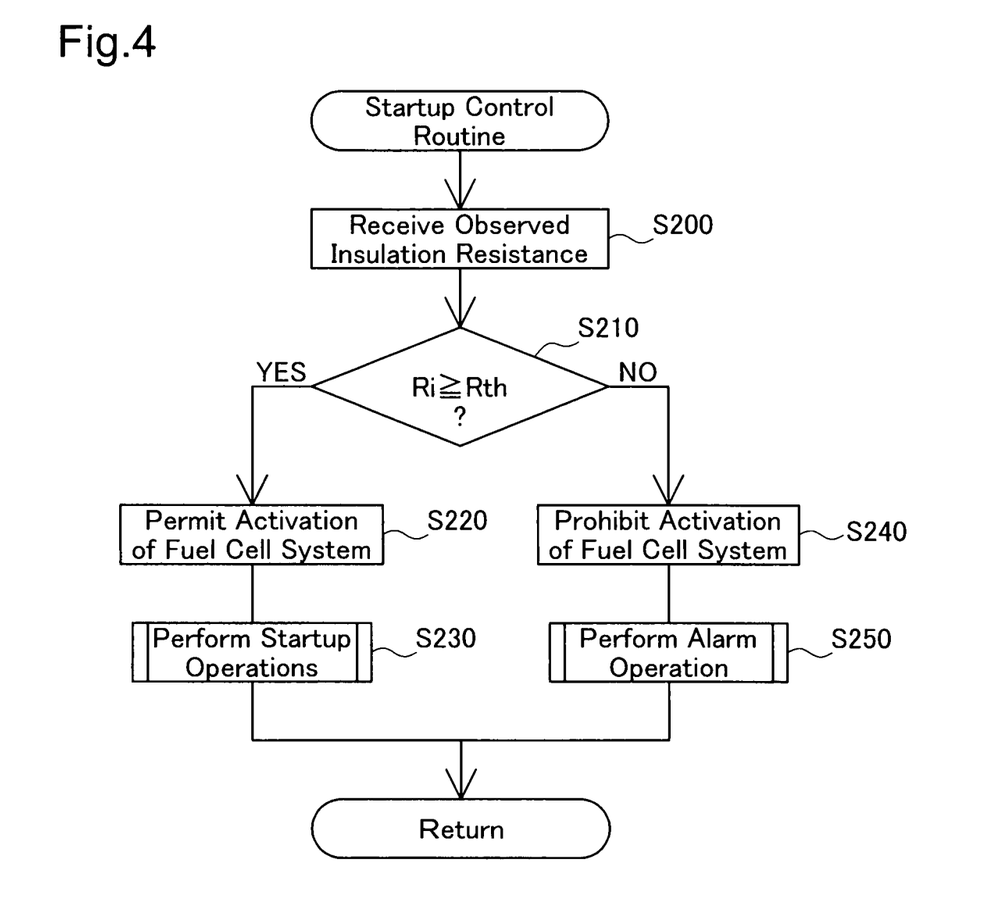
FIG. 4 is a flowchart showing a start-up control routine.

FIG. 4 is a flowchart showing a startup control routine executed for activation of the fuel cell system 100. The startup control is performed by the CPU of the control unit 500 in response to the driver's ON operation of a startup switch of the vehicle 1000. The startup control is performed at a restart of the vehicle 1000 after the motion of the vehicle 1000 on the water-covered road in this embodiment. The startup control may alternatively be performed at every start of the fuel cell system 100.

The CPU first receives an observed insulation resistance Ri between the fuel cell stack 10 and the stack casing 12 from the insulation resistance tester 74 (step S200) and determines whether the observed insulation resistance Ri is not lower than a preset reference resistance Rth (step S210). The reference resistance Rth is set to a sufficiently high value for ensuring insulation between the fuel cell stack 10 and the stack casing 12.

When the insulation resistance Ri observed by the insulation resistance tester 74 is not lower than the preset reference resistance Rth (step S210: yes), the CPU identifies the sufficient insulation between the fuel cell stack 10 and the stack casing 12. The CPU then permits activation of the fuel cell system 100 (step S220) and performs required startup operations for the fuel cell system 100, for example, warm-up operation of the fuel cell stack 10 (step S230).

When the insulation resistance Ri observed by the insulation resistance tester 74 is lower than the preset reference resistance Rth (step S210: no), on the other hand, the CPU identifies the insufficient insulation between the fuel cell stack 10 and the stack casing 12. The CPU then prohibits activation of the fuel cell system 100 (step S240) and performs an alarm operation (step S250) to warn the driver of an abnormality of the fuel cell system 100. The alarm operation may be, for example, lighting up an alarm lamp or producing an alarm sound.

As described above, the startup control of this embodiment effectively prevents a potential damage or failure of the fuel cell stack 10 due to a short circuit between the fuel cell stack 10 and the stack casing 12, thus ensuring a safe startup of the fuel cell system 100.

B. Second Embodiment

The configuration of a vehicle 1000 in a second embodiment is identical with the configuration of the vehicle 1000 in the first embodiment except partial difference of a fuel cell system 100A mounted on the vehicle 1000. The following describes the structure and the operations of the fuel cell system 100A mounted on the vehicle 1000 of the second embodiment.

B1. Structure of Fuel Cell System

Figure 5:
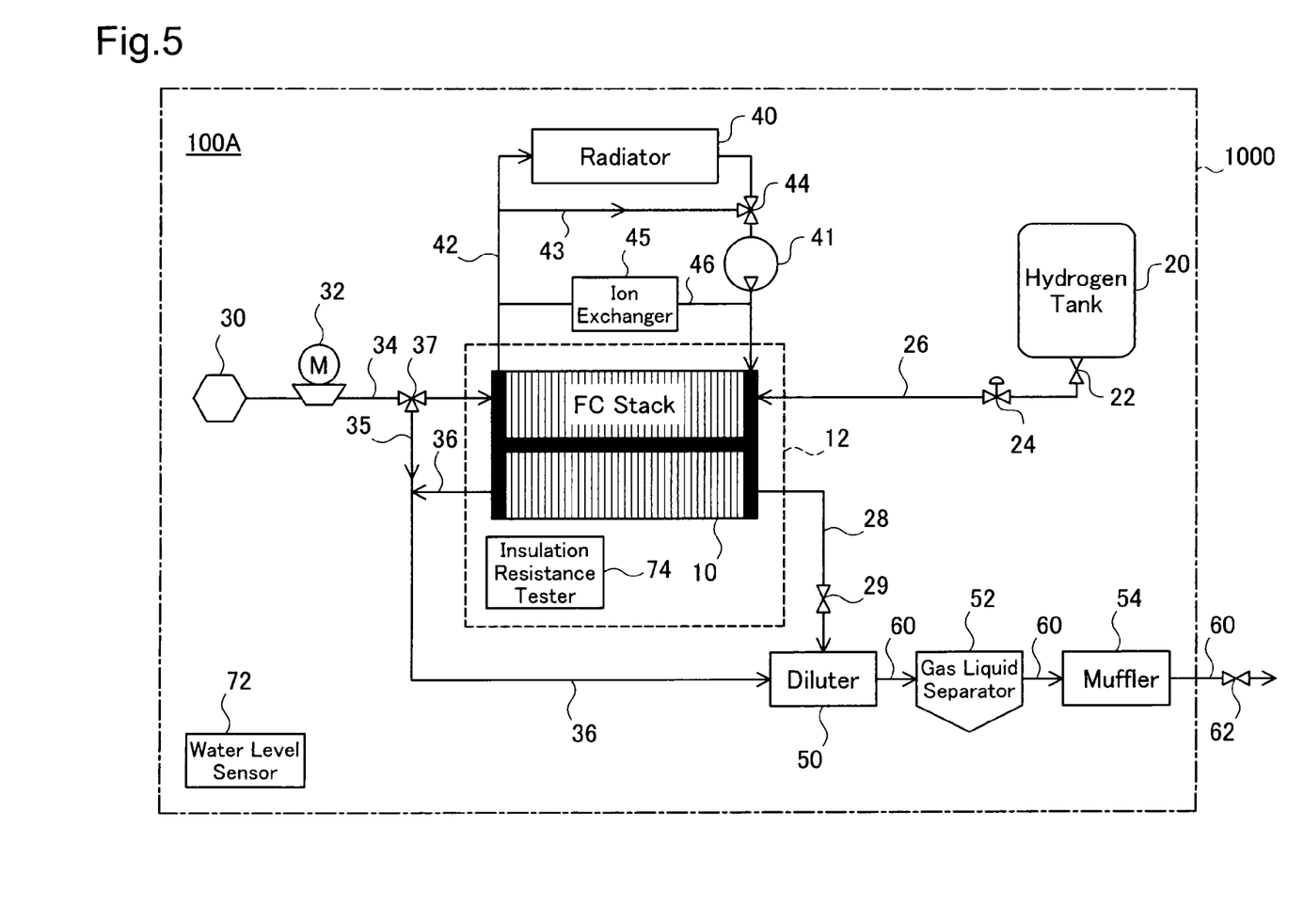
FIG. 5 schematically illustrates the structure of a fuel cell system 100A in a second embodiment.

FIG. 5 schematically shows the structure of the fuel cell system 100A in the second embodiment. As illustrated, the fuel cell system 100A of the second embodiment is similar to the fuel cell system 100 of the first embodiment. The following description thus regards only a different structural part of the fuel cell system 100A of the second embodiment from the fuel cell system 100 of the first embodiment, and explanation of the common structural part is omitted.

As illustrated, in the fuel cell system 100A of the second embodiment, a valve 29 is provided in the piping 28 to open and close the piping 28 and accordingly allow or prohibit the flow of the anode off gas. The valve 29 is equivalent to the passage switchover valve of the invention.

In the fuel cell system 100A of the second embodiment, bypass piping 35 as a branch path is connected to both the piping 34 and the piping 36. A three-way valve 37 is provided at a connection of the piping 34 with the bypass piping 35. A switchover of the three-way valve 37 changes over the flow path of the compressed air compressed by the air compressor 32 between the flow into the fuel cell stack 10 and the flow into the piping 36 with bypassing the fuel cell stack 10. The three-way valve 37 is equivalent to the changeover valve of the invention. The air compressor 32 and its relevant components correspond to the air supplier of the invention.

B2. Drive Control

Figure 6:
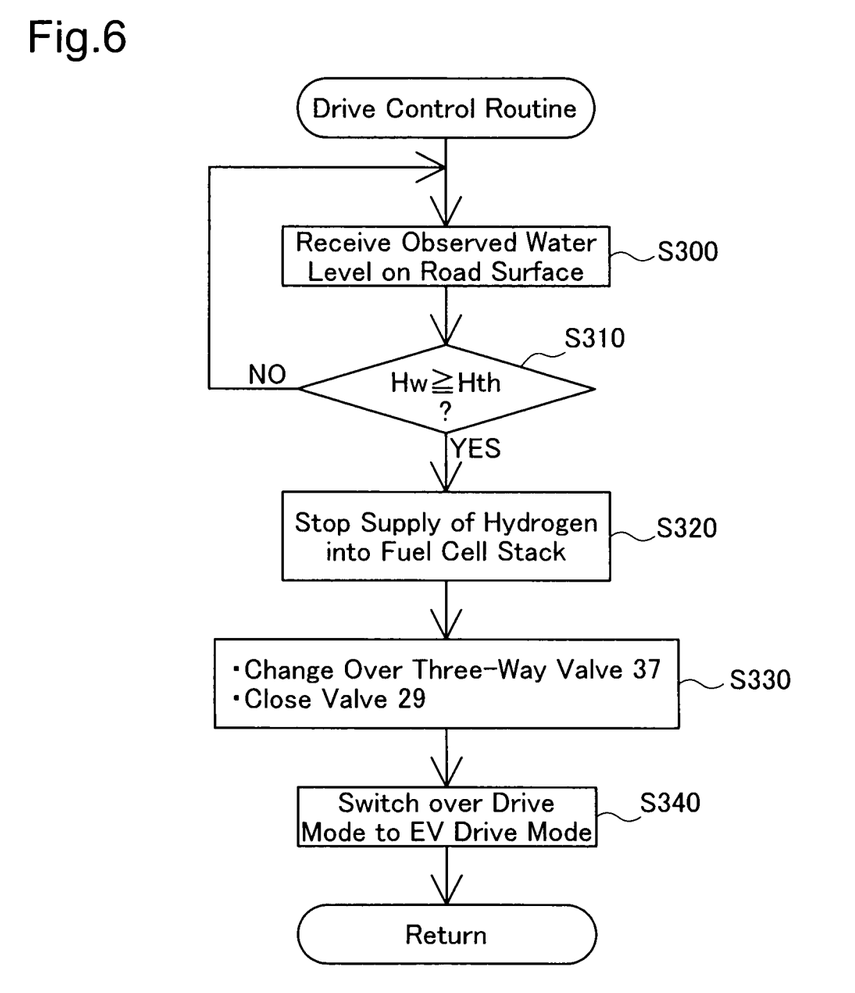
FIG. 6 is a flowchart showing a drive control routine executed in the second embodiment.

FIG. 6 is a flowchart showing a drive control routine executed in the second embodiment. This drive control is performed by the CPU of the control unit 500 during a motion of the vehicle 1000 in the FC drive mode.

The CPU first receives the observed water level Hw representing the level of water present on the road surface from the water level sensor 72 (step S300) and determines whether the observed water level Hw is not lower than the preset threshold value Hth (step S310).

When the water level Hw observed by the water level sensor 72 is not lower than the preset threshold value Hth (step S310: yes), the CPU identifies the potential for the inflow of water and sediment into the piping 60 through the outlet. The CPU accordingly stops the supply of hydrogen into the fuel cell stack 10 (step S320) to stop power generation of the fuel cell stack 10. The CPU then changes over the three-way valve 37 to enable the compressed air compressed by the air compressor 32 to be flowed into the piping 36 via the bypass piping 35 and closes the valve 29 (step S330). At this moment, the CPU may additionally increment the output of the air compressor 32 to increase the flow rate of the compressed air. The increased flow rate may be set to a maximum possible flow rate or may be varied according to the water level Hw observed by the water level sensor 72. The flow of the compressed air into the piping 36 raises the back pressure in the piping 60 and thereby more effectively prevents the inflow of water and sediment into the piping 60 through the outlet and protects the fuel cell stack 10 from a potential damage or failure. Closing the valve 29 prevents the compressed air flowing through the piping 36 from being flowed into the anodes of the fuel cell stack 10 via the piping 28.

The CPU subsequently controls the on-off conditions of the changeover switches 320a and 320b shown in FIG. 1 to switch over the drive mode from the FC drive mode to the EV drive mode (step S340).

When the water level Hw observed by the water level sensor 72 is lower than the preset threshold value Hth (step S310: no), on the other hand, the CPU identifies substantially no potential for the inflow of water and sediment into the piping 60 through the outlet and returns the drive control routine to step S300.

As described above, during a motion of the vehicle 1000 on the water-covered road in the FC drive mode, in response to detection of the level of water present on the road surface that is of or over the preset threshold value Hth, the drive control of the second embodiment immediately stops power generation by the fuel cell stack 10 to protect the fuel cell stack 10 from a potential damage or failure, while enabling the vehicle 1000 to be continuously driven with the switchover of the drive mode to the EV drive mode.

C. Third Embodiment

The configuration of a vehicle 1000 in a third embodiment is perfectly identical with the configuration of the vehicle 1000 in the first embodiment including the structure of the fuel cell system 100 mounted on the vehicle 1000. The following thus describes only a series of drive control executed in the third embodiment.

During the motion of the vehicle 1000 on the water-covered road in the FC drive mode, in response to detection of the level of water present on the road surface that is of or over the preset threshold value Hth, the drive control procedures of the first embodiment and the second embodiment explained above stop power generation by the fuel cell stack 10 and switch over the drive mode of the vehicle to the EV drive mode. The drive control procedures of the third embodiment and a fourth embodiment explained below, on the other hand, continuously drives the vehicle 1000 in the FC drive mode even when the level of water present on the water-covered road surface reaches or exceeds the preset threshold value Hth.

Figure 7:
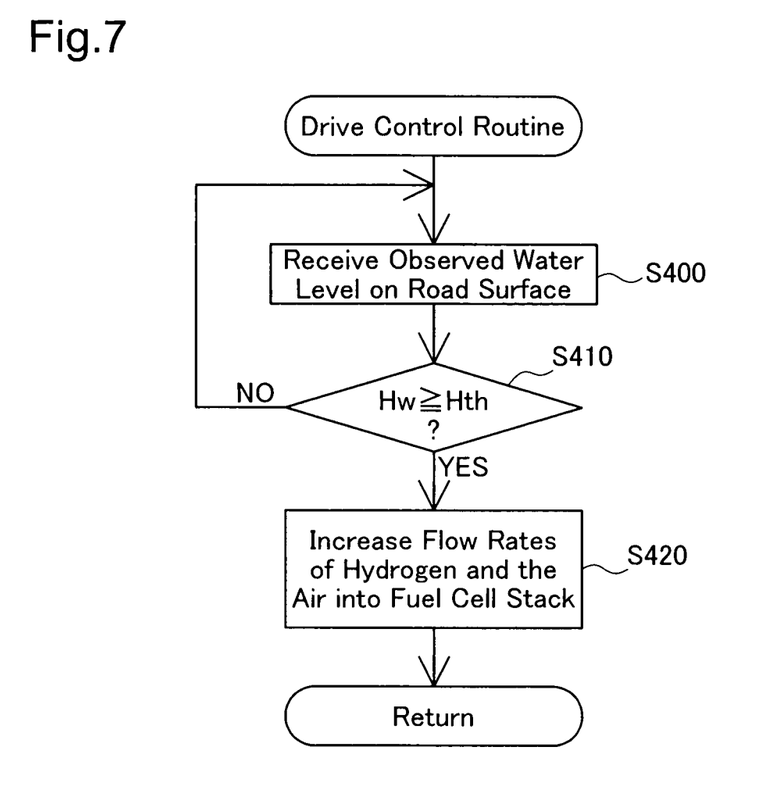
FIG. 7 is a flowchart showing a drive control routine executed in a third embodiment.

FIG. 7 is a flowchart showing a drive control routine executed in the third embodiment. This drive control is performed by the CPU of the control unit 500 during a motion of the vehicle 1000 in the FC drive mode.

The CPU first receives the observed water level Hw representing the level of water present on the road surface from the water level sensor 72 (step S400) and determines whether the observed water level Hw is not lower than the preset threshold value Hth (step S410).

When the water level Hw observed by the water level sensor 72 is not lower than the preset threshold value Hth (step S410: yes), the CPU identifies the potential for the inflow of water and sediment into the piping 60 through the outlet. The CPU accordingly increases the flow rates of hydrogen and the air into the fuel cell stack 10 to respective preset flow rates, irrespective of a power demand for the fuel cell stack 10 (step S420). The increased flow rates of hydrogen and the air may be set to maximum possible flow rates of hydrogen and the air or may be varied according to the water level Hw observed by the water level sensor 72. The increased flow rates of hydrogen and the air raise the back pressure in the piping 60 and thereby effectively prevent the inflow of water and sediment into the piping 60 through the outlet and protect the fuel cell stack 10 from a potential damage or failure.

When the water level Hw observed by the water level sensor 72 is lower than the preset threshold value Hth (step S410: no), on the other hand, the CPU identifies substantially no potential for the inflow of water and sediment into the piping 60 through the outlet and returns the drive control routine to step S400.

As described above, during a motion of the vehicle 1000 on the water-covered road in the FC drive mode, even in response to detection of the level of water present on the road surface that is of or over the preset threshold value Hth, the drive control of the third embodiment enables the vehicle 1000 to be continuously driven in the FC drive mode, while protecting the fuel cell stack 10 from a potential damage or failure.

D. Fourth Embodiment

The configuration of a vehicle 1000 in a fourth embodiment is identical with the configuration of the vehicle 1000 in the first embodiment except partial difference of a fuel cell system 100B mounted on the vehicle 1000. The following describes the structure and the operations of the fuel cell system 100B mounted on the vehicle 1000 of the fourth embodiment.

Figure 8:
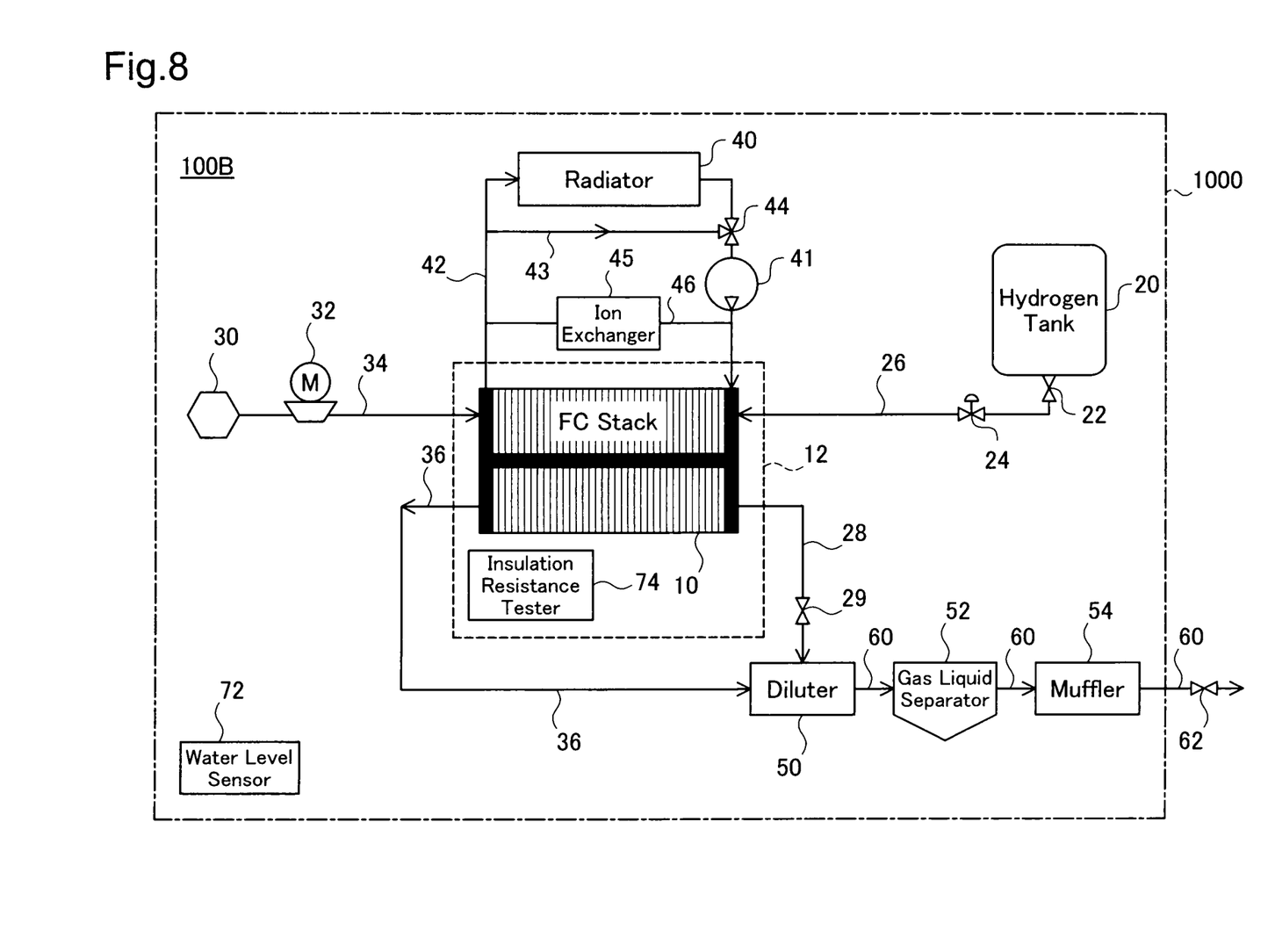
FIG. 8 schematically illustrates the structure of a fuel cell system 100B in a fourth embodiment.

FIG. 8 schematically shows the structure of the fuel cell system 100B in the fourth embodiment. As illustrated, the fuel cell system 100B of the fourth embodiment is similar to the fuel cell system 100 of the first embodiment, except a valve 29 that is provided in the piping 28 to open and close the piping 28 and accordingly allow or prohibit the flow of the anode off gas.

Figure 9:
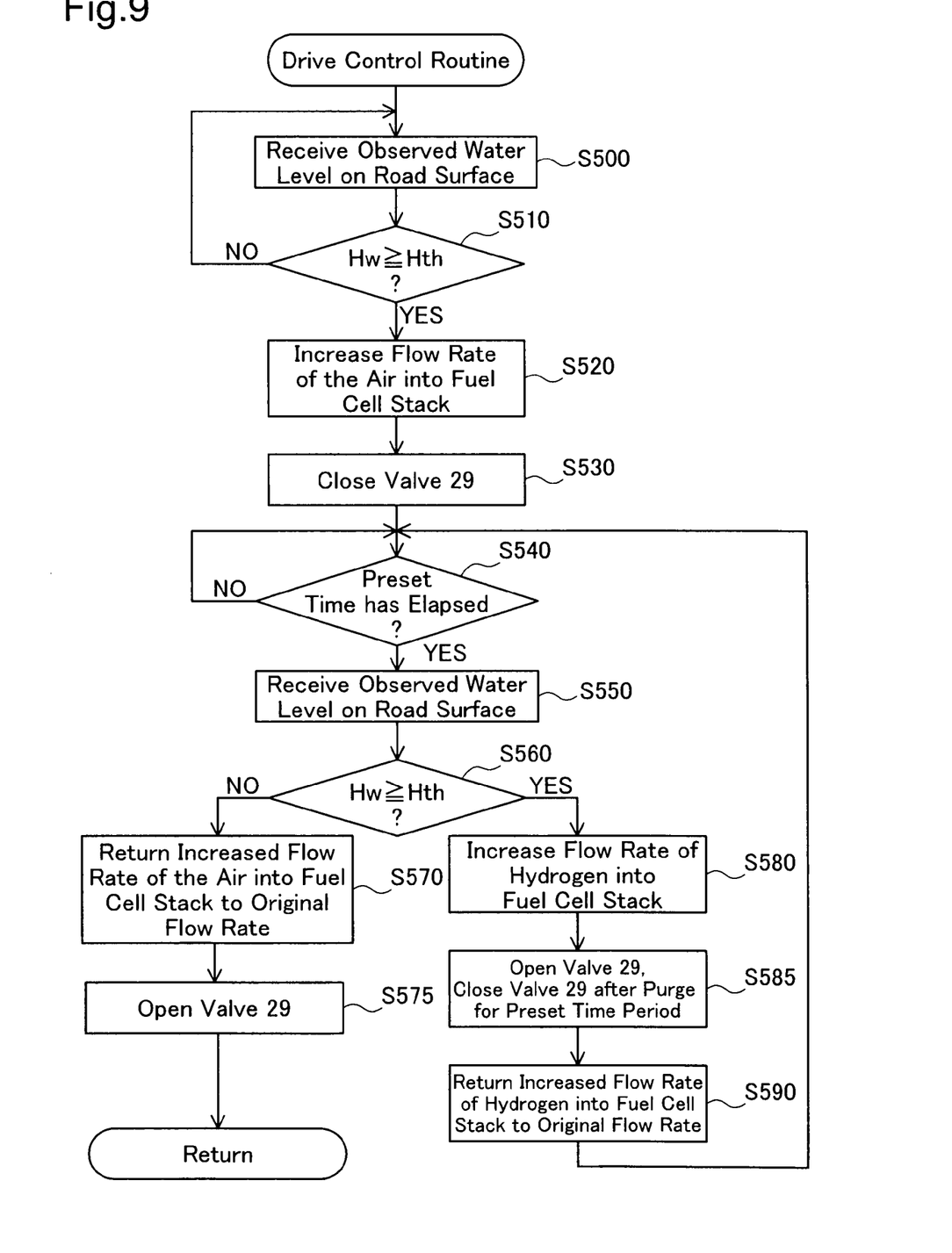
FIG. 9 is a flowchart showing a drive control routine in the fourth embodiment.

FIG. 9 is a flowchart showing a drive control routine executed in the fourth embodiment. This drive control is performed by the CPU of the control unit 500 during a motion of the vehicle 1000 in the FC drive mode.

The CPU first receives the observed water level Hw representing the level of water present on the road surface from the water level sensor 72 (step S500) and determines whether the observed water level Hw is not lower than the preset threshold value Hth (step S510).

When the water level Hw observed by the water level sensor 72 is not lower than the preset threshold value Hth (step S510: yes), the CPU identifies the potential for the inflow of water and sediment into the piping 60 through the outlet. The CPU accordingly increases the flow rate of the air into the fuel cell stack 10 to a preset flow rate, irrespective of a power demand for the fuel cell stack 10 (step S520) and closes the valve 29 (step S530). The increased flow rate of the air may be set to a maximum possible flow rate of the air or may be varied according to the water level Hw observed by the water level sensor 72. The increased flow rate of the air raises the back pressure in the piping 60 and thereby effectively prevents the inflow of water and sediment into the piping 60 through the outlet and protects the fuel cell stack 10 from a potential damage or failure. Closing the valve 29 prevents the cathode off gas flowing through the piping 36 from being flowed into the anodes of the fuel cell stack 10 via the piping 28.

When the water level Hw observed by the water level sensor 72 is lower than the preset threshold value Hth (step S510: no), on the other hand, the CPU identifies substantially no potential for the inflow of water and sediment into the piping 60 through the outlet and returns the drive control routine to step S500.

In the fuel cell system 100B of the fourth embodiment, the air is supplied as the oxidizing gas to the fuel cell stack 10. The air contains nitrogen and other impurity gases that are not subjected to power generation by the fuel cell stack 10. The impurity gases are transmitted through the electrolyte membrane to move from the cathode to the anode in the fuel cell stack 10. In the case of power generation by the fuel cell stack 10 in the closed state of the piping 28 by closing the valve 29 at step S530, the impurity gases are not discharged outside but are accumulated in the fuel cell stack 10 and in the piping 28 to lower the power generation performance. The drive control of the fourth embodiment accordingly purges the inside of the fuel cell stack 10 and the inside of the piping 28 at appropriate timings.

The CPU waits until elapse of a preset time period (step S540) since closing of the valve 29 at step S530. This time period is set in a specific range of preventing a decrease in power generation performance of the fuel cell stack 10 due to accumulation of the impurity gases in the fuel cell stack 10 and in the piping 28.

After elapse of the preset time period since closing of the valve 29 (step S540: yes), the CPU again receives the observed water level Hw representing the level of water present on the road surface from the water level sensor 72 (step S550) and determines whether the observed water level Hw is not lower than the preset threshold value Hth (step S560).

When the water level Hw observed by the water level sensor 72 is lower than the preset threshold value Hth (step S560: no), the CPU identifies substantially no potential for the inflow of water and sediment into the piping 60 through the outlet. The CPU accordingly returns the increased flow rate of the air into the fuel cell stack 10 to its original flow rate corresponding to the power demand for the fuel cell stack 10 (step S570), opens the valve 29 (step S575), and causes the vehicle 1000 to be driven in the ordinary FC drive mode.

When the water level Hw observed by the water level sensor 72 is still not lower than the preset threshold value Hth (step S560: yes), on the other hand, the CPU increases the flow rate of hydrogen into the fuel cell stack 10 to a preset flow rate (for example, a maximum possible flow rate of hydrogen), irrespective of the power demand for the fuel cell stack 10 (step S580) to increase the back pressure in the piping 28 over the back pressure in the piping 36. The CPU subsequently opens the valve 29, purges the inside of the hydrogen flow path in the fuel cell stack 10 and inside of the piping 28 for a preset time period, and closes the valve 29 (step S585). This series of processing desirably purges inside of the hydrogen flow path in the fuel cell stack 10 and inside of the piping 28, while preventing the inflow of the cathode off gas from the piping 36 into the piping 28.

The CPU then returns the increased flow rate of hydrogen into the fuel cell stack 10 to its original flow rate corresponding to the power demand for the fuel cell stack 10 (step S590) and goes back to step S540.

As described above, during a motion of the vehicle 1000 on the water-covered road in the FC drive mode, even in response to detection of the level of water present on the road surface that is of or over the preset threshold value Hth, the drive control of the fourth embodiment enables the vehicle 1000 to be continuously driven in the FC drive mode, while protecting the fuel cell stack 10 from a potential damage or failure.

E. Other Aspects

The embodiments discussed above are to be considered in all aspects as illustrative and not restrictive. There may be many modifications, changes, and alterations without departing from the scope or spirit of the main characteristics of the present invention. Some examples of possible modification are given below.

E1. Modified Example 1

In the drive control of the second embodiment (see FIG. 6), after step S340, one modified flow may again receive the observed water level Hw representing the level of water present on the road surface from the water level sensor 72 and determine whether the observed water level Hw is not lower than a predetermined reference value Htha that is greater than the preset threshold value Hth. When the observed water level Hw is not lower than the predetermined reference value Htha, the modified flow closes the discharge valve 62. The reference value Htha may be determined arbitrarily. In the case where the back pressure of the compressed air is not sufficient for preventing the inflow of water and sediment into the piping 60 through the outlet, this arrangement effectively prevents the inflow of water and sediment.

E2. Modified Example 2

The vehicles 1000 of the first embodiment, the second embodiment, and the fourth embodiment are respectively equipped with the fuel cell system 100, the fuel cell system 100A, and the fuel cell system 100B. The fuel cell system 100A of the second embodiment may be applied to the other embodiments. One modified flow of the drive control of the third embodiment (see FIG. 7) may additionally perform the drive control of the first embodiment (see FIG. 3) or the drive control of the second embodiment (see FIG. 6) after step S420.

Similarly one modified flow of the drive control of the fourth embodiment (see FIG. 9) may additionally perform the drive control of the first embodiment (see FIG. 3) or the drive control of the second embodiment (see FIG. 6) after step S590. In such cases, the preset threshold value Hth used at step S110 or step S310 is replaced by a predetermined reference value that is greater than the preset threshold value Hth.

E3. Modified Example 3

In the structure of any of the embodiments described above, the water level sensor 72 is used as the detector of the invention. The water level sensor 72 is, however, neither restrictive nor essential. The water level sensor 72 may be replaced with any other suitable means having the function of detecting the environment surrounding the vehicle 1000. One available means may identify the presence of any obstructing object on the road surface, for example, based on water coverage information collected from an information center by communication. Another available means may take an image of the road surface condition with a camera mounted on the driving vehicle and analyzes the taken image by image processing to identify the presence of any obstructing object on the road surface.

E4. Modified Example 4

In the structure of any of the embodiments described above, the secondary battery 200 is used as the second battery of the invention. The secondary battery 200 is, however, neither restrictive nor essential. The second battery of the invention may be any battery other than the fuel cells, for example, a primary battery or a solar battery.

E5. Modified Example 5

In the fuel cell system 100A mounted on the vehicle 1000 of the second embodiment, one air compressor 32 is used as both the oxidizing gas supplier and the air supplier of the invention. This arrangement is, however, neither restrictive nor essential. An additional air compressor may be provided separately from the air compressor 32 to be exclusively used for increasing the back pressure in the piping 36 at step S330 in the drive control of the second embodiment (see FIG. 6). In this modification, the bypass piping 35 and the three-way valve 37 may be omitted from the fuel cell system 100A. The structure of the second embodiment is, however, preferable for size reduction of the fuel cell system 100A and the vehicle 1000, since one air compressor 32 is used as both the oxidizing gas supplier and the air supplier of the invention.

E6. Modified Example 6

In the structure of any of the embodiments described above, the anode off gas exhausted from the fuel cell stack 10 is flowed through the piping 28 and is discharged outside. In one modified structure, a circulation pipe and a circulation pump may be provided between the piping 28 and the piping 26. Such modification enables remaining hydrogen contained in the anode off gas to be recycled for power generation by the fuel cell stack 10 and desirably enhances the utilization efficiency of hydrogen.

E7. Modified Example 7

All the above embodiments regard application of the invention to the vehicles 1000. This is, however, neither restrictive nor essential. The technique of the present invention is applicable to any of various moving bodies that are equipped with fuel cells and are moved with electric power generated by the fuel cells as a power source. Typical examples of such moving bodies include aircraft and boats and ships, as well as the vehicles described above.

E8. Modified Example 8

In any of the embodiments described above, the vehicle 1000 performs the drive control for driving on the water-covered road with referring to the water level Hw observed by the water level sensor 72. This arrangement is, however, neither restrictive nor essential. In general, the technique of the invention detects the environment surrounding the moving body, identifies the potential or no potential for any obstructing object to block the outlet provided at the end of the piping 60 or to be flowed into the piping 60 through the outlet, and performs required control operations upon identification of the potential for any obstructing object to block the outlet provided at the end of the piping 60 or to be flowed into the piping 60 through the outlet. The obstructing object is not restricted to water present on the water-covered road but also includes sediment present on the road surface, dropping objects from the air, falling objects, and floating objects. The above identification and control may be based on detection of any of these obstructing objects.

The invention claimed is:

1. A moving body equipped with fuel cells, the moving body comprising:
    a motor configured to be driven with electric power output from the fuel cells;
    an exhaust pipe arranged to discharge an exhaust fluid from the fuel cells to outside of the moving body via an outlet;
    a detector configured to detect an environment surrounding the moving body;
    a decision module configured to identify a potential or no potential for any obstructing object to block the outlet or to be flowed into the exhaust pipe through the outlet, based on a result of detection by the detector; and
    a controller configured to, upon identification of the potential for any obstructing object to block the outlet or to be flowed into the exhaust pipe through the outlet by the decision module, stop power generation by the fuel cells.

2. The moving body in accordance with claim 1, the moving body further including:
    a second battery other than the fuel cells; and
    a changeover switch designed to change over a driving source of the motor between the electric power output from the fuel cells and electric power output from the second battery,
    wherein upon identification of the potential for any obstructing object to block the outlet or to be flowed into the exhaust pipe through the outlet by the decision module, the controller controls an operation of the changeover switch to change over the driving source of the motor to the electric power output from the second battery.

3. The moving body in accordance with either one of claims 1 and 2, wherein a discharge valve is provided either at the outlet or in the exhaust pipe, and
    upon identification of the potential for any obstructing object to block the outlet or to be flowed into the exhaust pipe through the outlet by the decision module, the controller closes the discharge valve.

4. The moving body in accordance with either one of claims 1 and 2, the moving body further including:
    an air supplier configured to supply the air, which has a higher pressure than a back pressure of the exhaust fluid in the exhaust pipe, to the exhaust pipe,
    wherein upon identification of the potential for any obstructing object to block the outlet or to be flowed into the exhaust pipe through the outlet by the decision module, the controller controls an operation of the air supplier to supply the air to the exhaust pipe.

5. The moving body in accordance with claim 4, wherein the fuel cells are equipped with an oxidizing gas supplier to supply an oxidizing gas,
    the oxidizing gas supplier includes an air compressor designed to compress the air as the oxidizing gas, and
    the air compressor is also used as the air supplier.

6. The moving body in accordance with claim 5, the moving body further including:
    a bypass conduit arranged to supply the compressed air compressed by the air compressor to the exhaust pipe with bypassing the fuel cells; and
    a changeover valve designed to change over a supply destination of the compressed air between the fuel cells and the exhaust pipe via the bypass conduit,
    wherein upon identification of the potential for any obstructing object to block the outlet or to be flowed into the exhaust pipe through the outlet by the decision module, the controller controls an operation of the changeover valve to supply the compressed air to the exhaust pipe via the bypass conduit.

7. The moving body in accordance claim 4, wherein the exhaust pipe includes:
    an anode off gas discharge conduit arranged to flow an anode off gas discharged from anodes of the fuel cells; and a cathode off gas discharge conduit arranged to flow a cathode off gas discharged from cathodes of the fuel cells, wherein the anode off gas discharge conduit joins with the cathode off gas discharge conduit, the anode off gas discharge conduit is equipped with a passage switchover valve arranged to switch over between passage and blockage of the anode off gas discharge conduit, and upon identification of the potential for any obstructing object to block the outlet or to be flowed into the exhaust pipe through the outlet by the decision module, the controller controls an operation of the passage switchover valve to switch over to the blockage of the anode off gas discharge conduit.

8. A moving body equipped with fuel cells, the moving body comprising:

a motor configured to be driven with electric power output from the fuel cells;

a fuel gas supplier arranged to supply a fuel gas to the fuel cells;

an oxidizing gas supplier arranged to supply an oxidizing gas to the fuel cells;

an exhaust pipe arranged to discharge an exhaust gas from the fuel cells to outside of the moving body via an outlet;

a detector configured to detect an environment surrounding the moving body;

a decision module configured to identify a potential or no potential for any obstructing object to block the outlet or to be flowed into the exhaust pipe through the outlet, based on a result of detection by the detector; and a controller configured to, upon identification of the potential for any obstructing object to block the outlet or to be flowed into the exhaust pipe through the outlet by the decision module, increase at least one of a flow rate of the fuel gas to the fuel cells by the fuel gas supplier and a flow rate of the oxidizing gas to the fuel cells by the oxidizing gas supplier, irrespective of a power demand for the fuel cells.

9. The moving body in accordance with claim 8, wherein the exhaust pipe includes:

an anode off gas discharge conduit arranged to flow an anode off gas discharged from anodes of the fuel cells; and a cathode off gas discharge conduit arranged to flow a cathode off gas discharged from cathodes of the fuel cells, wherein the anode off gas discharge conduit joins with the cathode off gas discharge conduit, the anode off gas discharge conduit is equipped with a passage switchover valve arranged to switch over between passage and blockage of the anode off gas discharge conduit, and upon identification of the potential for any obstructing object to block the outlet or to be flowed into the exhaust pipe through the outlet by the decision module, the controller controls an operation of the passage switchover valve to switch over to the blockage of the anode off gas discharge conduit, while increasing the flow rate of the oxidizing gas to the fuel cells by the oxidizing gas supplier, irrespective of the power demand for the fuel cells.

10. The moving body in accordance with claim 9, wherein in the event of re-identification of the potential for any obstructing object to block the outlet or to be flowed into the exhaust pipe through the outlet by the decision module after elapse of a preset time period since the controller controlled the operation of the passage switchover valve to switch over to the blockage of the anode off gas discharge conduit and increased the flow rate of the oxidizing gas to the fuel cells by the oxidizing gas supplier irrespective of the power demand for the fuel cells in response to identification of the potential for any obstructing object to block the outlet or to be flowed into the exhaust pipe through the outlet by the decision module, the controller controls the operation of the passage switchover valve to switch over to the passage of the anode off gas discharge conduit, while increasing a back pressure of the anode off gas in the anode off gas discharge conduit to be higher than a back pressure of the cathode off gas in the cathode off gas discharge conduit.

11. A control method of fuel cells mounted on a moving body, the moving body having: a motor configured to be driven with electric power output from the fuel cells; and an exhaust pipe arranged to discharge an exhaust fluid from the fuel cells to outside of the moving body via an outlet, the control method comprising:

a detection step of detecting an environment surrounding the moving body;

a decision step of identifying a potential or no potential for any obstructing object to block the outlet or to be flowed into the exhaust pipe through the outlet, based on a result of detection in the detection step; and a control step of, upon identification of the potential for any obstructing object to block the outlet or to be flowed into the exhaust pipe through the outlet in the decision step, stopping power generation by the fuel cells.

12. A control method of fuel cells mounted on a moving body, the moving body having: a motor configured to be driven with electric power output from the fuel cells; a fuel gas supplier arranged to supply a fuel gas to the fuel cells; an oxidizing gas supplier arranged to supply an oxidizing gas to the fuel cells; and an exhaust pipe arranged to discharge an exhaust gas from the fuel cells to outside of the moving body via an outlet, the control method comprising:

a detection step of detecting an environment surrounding the moving body;

a decision step of identifying a potential or no potential for any obstructing object to block the outlet or to be flowed into the exhaust pipe through the outlet, based on a result of detection in the detection step; and a control step of, upon identification of the potential for any obstructing object to block the outlet or to be flowed into the exhaust pipe through the outlet in the decision step, increasing at least one of a flow rate of the fuel gas to the fuel cells by the fuel gas supplier and a flow rate of the oxidizing gas to the fuel cells by the oxidizing gas supplier, irrespective of a power demand for the fuel cells.

\* \* \* \* \*